United States Patent
Masumoto

(10) Patent No.: US 10,279,667 B2
(45) Date of Patent: May 7, 2019

(54) SEAL FOR AUTOMOBILE DOOR

(71) Applicant: NISHIKAWA RUBBER CO., LTD., Hiroshima (JP)

(72) Inventor: Atsuo Masumoto, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 156 days.

(21) Appl. No.: 15/459,430

(22) Filed: Mar. 15, 2017

(65) Prior Publication Data

US 2017/0274748 A1    Sep. 28, 2017

(30) Foreign Application Priority Data

Mar. 28, 2016 (JP) ................... 2016-064659

(51) Int. Cl.
| | |
|---|---|
| *B60J 10/75* | (2016.01) |
| *B60J 10/18* | (2016.01) |
| *B60J 10/767* | (2016.01) |
| *B60J 10/21* | (2016.01) |
| *B60J 10/76* | (2016.01) |
| *B60J 10/22* | (2016.01) |

(52) U.S. Cl.
CPC ............ *B60J 10/75* (2016.02); *B60J 10/18* (2016.02); *B60J 10/21* (2016.02); *B60J 10/22* (2016.02); *B60J 10/76* (2016.02); *B60J 10/767* (2016.02)

(58) Field of Classification Search
CPC ... B60J 10/75; B60J 10/76; B60J 10/21; B60J 10/22
See application file for complete search history.

(56) References Cited

U.S. PATENT DOCUMENTS

| | | | | |
|---|---|---|---|---|
| 4,817,336 A | * | 4/1989 | Kisanuki ............... | B60J 10/21 296/154 |
| 4,894,954 A | * | 1/1990 | Nozaki ............... | B60J 10/235 49/373 |
| 6,070,364 A | * | 6/2000 | Berry ................... | B60J 10/235 49/441 |
| 6,502,832 B2 | * | 1/2003 | Goto ................... | F16J 15/025 277/642 |
| 2001/0010417 A1 | | 8/2001 | Goto et al. | |
| 2017/0225552 A1 | * | 8/2017 | Masumoto ............ | B60J 10/22 |

(Continued)

FOREIGN PATENT DOCUMENTS

| | | |
|---|---|---|
| JP | 3726658 B2 | 10/2005 |
| JP | 4284804 B2 | 4/2009 |

*Primary Examiner* — Gregory J Strimbu
(74) *Attorney, Agent, or Firm* — Renner Otto Boisselle & Sklar, LLP

(57) ABSTRACT

A seal for an automobile door includes a glass run and a belt line inner seal. The glass run has a vertical portion which includes a vertical seal lip, and the belt line inner seal includes an upper belt line seal lip and a lower belt line seal lip. The vertical seal lip is integral and unitary with ends of the upper and lower belt line seal lips, and the vertical portion includes a A-divider wall portion extending vertically and protruding toward the outside of a cabin of the automobile between the upper and lower belt line seal lips. A predetermined gap is formed between the lower belt line seal lip and the divider wall portion when the window glass is in an open state, and the lower belt line seal lip contacts the divider wall portion when the window glass is in a closed state.

8 Claims, 12 Drawing Sheets

(56) References Cited

U.S. PATENT DOCUMENTS

| | | | | |
|---|---|---|---|---|
| 2017/0232827 A1* | 8/2017 | Ogawa | ............... | B60J 10/75 49/495.1 |
| 2018/0022196 A1* | 1/2018 | Masumoto | ............... | B60J 10/76 49/428 |

* cited by examiner

SEAL FOR AUTOMOBILE DOOR

CROSS-REFERENCE TO RELATED APPLICATION

This application claims priority to Japanese Patent Application No. 2016-064659 filed on Mar. 28, 2016, the entire disclosure of which is incorporated by reference herein.

BACKGROUND

The present disclosure relates to a seal for sealing a gap between a door and window glass of an automobile. In particular, the disclosure relates to a configuration in which a belt line seal arranged on a belt line of a door is integrally molded with a glass run arranged on a frame.

In general, to provide a window glass which is movable up and down for a door of an automobile, a configuration including a window frame supporting a peripheral portion of the window glass, and a glass run made of an elastic member and assembled to the window frame may be adopted in some cases. The glass run includes a pair of front and rear vertical portions extending in the moving direction of the window glass, and an upper portion connecting the front and rear vertical portions. Further, a belt line inner seal extending in a lengthwise direction of the automobile is provided on an inner side of a belt line of the door of the automobile closer to the inside of a cabin. A seal for an automobile door has been known in which a front end of the belt line inner seal and the front vertical portion of the glass run are integrally molded, and a rear end of the belt line inner seal and the rear vertical portion of the glass run are integrally molded as well (see, e.g., Japanese Patents Nos. 3726658 and 4284804).

According to Japanese Patents Nos. 3726658 and 4284804, a glass run has front and rear vertical portions, each of which is U-shaped when viewed in section. The front and rear vertical portions extend to reach the inside of a door body, and their ends are open in the inside of the door body. An inner lip which comes into contact with an inner surface of the window glass facing the inside of the cabin is provided for the respective front and rear vertical portions. Further, an inner lip which comes into contact with the inner surface of the window glass is also provided for the belt line inner seal as well.

SUMMARY

In the seal for the automobile door according to Japanese Patents Nos. 3726658 and 4284804, the front end of the belt line inner seal and the front vertical portion of the glass run are integrally molded, and the rear end of the belt line inner seal and the rear vertical portion of the glass run are integrally molded as well. Thus, the glass run and the belt line inner seal do not form any gap, which could allow sound and/or air inside the door body to enter the cabin, between them.

However, the front and rear vertical portions of the glass run extend until they reach the inside of the door body, and their ends are open inside the body. Thus, the sound and/or air inside the door body may presumably go upward through the inside of the front and rear vertical portions. The flow of the sound and/or air going upward through the inside of the front and rear vertical portions may possibly reach the inside of the belt line inner seal because the belt line inner seal is integrated with the front and rear vertical portions at their vertical intermediate portions. In such a case, since the belt line inner seal is generally positioned on the side of a passenger, the flow of the sound and/or air inside the belt line inner seal comes close to him or her, which may deteriorate cabin quietness.

To cope with this problem, a wall may be provided inside the glass run and/or the belt line inner seal to block the flow of the sound and/or air. In such a case, the wall inevitably extends in a widthwise direction of the vehicle. Thus, when a portion of the glass run or the belt line inner seal provided with the wall comes into contact with the inner surface of the window glass moving up or down, a great repulsive force is exerted on that portion by the wall in the widthwise direction of the vehicle, which may lead to wear of that portion.

In view of the foregoing, it is therefore an object of the present disclosure to improve a resistance of the seal to wear by the window glass which slides on the seal when moving up or down, while enhancing cabin quietness by preventing the flow of sound and/or air from reaching the inside of the belt line inner seal through the inside of the vertical portions of the glass run which is integrally molded with the belt line inner seal.

To achieve the above-described object, a first aspect of the present disclosure is directed to a seal for an automobile door including: a glass run which is assembled to a window frame supporting a peripheral portion of a window glass provided for a door of an automobile such that the window glass is movable up and down; and a belt line inner seal which is provided on an inner side of a belt line of a body of the door closer to the inside of a cabin and extends in a lengthwise direction of a vehicle, the glass run including a vertical portion extending in a moving direction of the window glass such that a lower end thereof is open inside the body of the door, and the belt line inner seal having an end in the lengthwise direction of the vehicle being integrally molded with the vertical portion. In this seal for the automobile door, the vertical portion of the glass run includes a vertical seal lip which is configured to be elastically deformed when coming into contact with an inner surface of the window glass facing the inside of the cabin, the vertical seal lip is continuous with ends of the upper and lower belt line seal lips in the lengthwise direction of the vehicle, the vertical portion includes a divider wall portion extending in the vertical direction and protruding toward the outside of the cabin between the upper and lower belt line seal lips, and a space surrounded by the seal for the automobile door and the window glass is divided into a space closer to the vertical portion and a space closer to the belt line inner seal.

In this configuration, the vertical portion of the glass run is integrally molded with the belt line inner seal. Thus, the vertical portion and the belt line inner seal do not form any gap, which could allow sound and/or air inside the body of the door to easily enter the cabin, between them.

Further, when the window glass is closed, the vertical seal lip of the glass run, and the upper and lower belt line seal lips of the belt line inner seal come into contact with the inner surface of the window glass facing the inside of the cabin, which may ensure sealability. Moreover, a space surrounded by the seal for the automobile door and the window glass is divided into a space closer to the vertical portion and a space closer to the belt line inner seal. Thus, even if sound and/or air inside the body of the door goes upward through the inside of the vertical portion, the sound and/or air hits the divider wall portion, and may be prevented from entering the inside of the belt line inner seal. This may improve cabin quietness.

A second aspect of the present disclosure is an embodiment of the first aspect. According to the second aspect, the lower belt line seal lip separates from the divider wall portion to form a predetermined gap between the lower belt line seal lip and the divider wall portion when the window glass is opened and separates from the lower belt line seal lip, and the space surrounded by the seal for the automobile door and the window glass is divided into the space closer to the vertical portion and the space closer to the belt line inner seal when the lower belt line seal lip, which is in contact with the window glass in a closed state and elastically deformed, comes into contact with the divider wall portion.

In this configuration, if the lower belt line seal lip comes into contact with the closed window glass and was elastically deformed toward the inside of the cabin, an inner surface of the lower belt line seal lip closer to the inside of the cabin comes into contact with the divider wall portion of the glass run. Thus, a space inside the seal for the automobile door is divided into a space closer to the vertical portion and a space closer to the belt line inner seal. Therefore, even if sound and/or air inside the body of the door goes upward through the inside of the vertical portion, the sound and/or air hits the divider wall portion, and does not enter the inside of the belt line inner seal. This may improve cabin quietness.

On the other hand, when the window glass is opened, the window glass separates from the lower belt line seal lip. At this time, the lower belt line seal lip returns to the original shape, and the inner surface of the lower belt line seal lip separates from the divider wall portion. Thus, a predetermined gap is formed between the lower belt line seal lip and the divider wall portion. That is to say, dimensions and shapes of the respective portions are determined such that the lower belt line seal lip comes into contact with the divider wall portion only when the window glass is closed. Thus, a portion corresponding to the divider wall portion may be prevented from coming into contact strongly with the inner surface of the window glass when the open window glass is closed. This may improve a resistance of the seal to wear by the window glass which slides on the seal when moving up or down.

A third aspect of the present disclosure is an embodiment of the first aspect. According to the third aspect, an edge of the divider wall portion closer to the outside of the cabin has a notch to be fitted on the lower belt line seal lip which is in contact with the window glass in the closed state and elastically deformed.

In this configuration, when the window glass is closed, the lower belt line seal lip is elastically deformed, and fitted in the notch of the divider wall portion. This may reduce the possibility of gap formation between the lower belt line seal lip and the divider wall portion, thereby preventing sound and/or air going upward through the inside of the vertical portion from going to the inside of the belt line inner seal. Further, the lower belt line seal lip fitted in the notch of the divider wall portion may further reduce a sliding resistance between the seal and the window glass moving up or down.

A fourth aspect of the present disclosure is an embodiment of the first aspect. According to the fourth aspect, the divider wall portion is inclined or curved such that its lower portion is positioned closer to a middle portion of the seal for the automobile door in the lengthwise direction of the vehicle than its upper portion.

Specifically, when the open window glass moves upward, a front or rear corner of the window glass may possibly be caught on the divider wall portion. According to the present disclosure, however, the divider wall portion is inclined or curved such that its lower portion is positioned closer to the middle portion of the seal for the automobile door in the lengthwise direction of the vehicle than its upper portion, and thus, is away from the corner of the window glass. Therefore, when the window glass moves upward, the front or rear corner of the window glass is not easily caught on the divider wall portion.

A fifth aspect of the present disclosure is an embodiment of the first aspect. According to the fifth aspect, an upper portion and a lower portion of the divider wall portion are continuous with the vertical seal lip.

In this configuration, the divider wall portion between the upper and lower belt line seal lips is continuous with the vertical seal lip. Thus, a gap between the upper and lower belt line seal lips may be sealed with reliability.

A sixth aspect of the present disclosure is an embodiment of the first aspect. According to the sixth aspect, the vertical portion includes an inner wall portion closer to the inside of the cabin and an outer wall portion closer to the outside of the cabin, the inner and outer wall portions being arranged to sandwich the window glass, the vertical seal lip is formed on an outer surface of the inner wall portion closer to the outside of the cabin, the inner wall portion and the vertical seal lip are connected via a connecting wall portion extending from the inner wall portion to the vertical seal lip, and the connecting wall portion extends from a proximal end to a distal end of the vertical seal lip.

Specifically, since a cavity is formed between the inner wall portion of the vertical portion closer to the inside of the cabin and the vertical seal lip, sound and/or air inside the body of the door may possibly go upward through the cavity between the inner wall portion and the vertical seal lip, which may cause a noise on the side of a passenger. According to the present disclosure, however, the inner wall portion and the vertical seal lip are connected via a connecting wall portion extending from a proximal end to a distal end of the vertical seal lip. Thus, the sound and/or air going upward through the cavity between the inner wall portion and the vertical seal lip may be blocked by the connecting wall portion. This may reduce the chance that the sound and/or air will come to the side of the passenger, thereby further improving cabin quietness.

A seventh aspect of the present disclosure is an embodiment of the sixth aspect. According to the seventh aspect, the connecting wall portion is inclined such that one end of the connecting wall portion in the lengthwise direction of the vehicle is positioned lower than the other end of the connecting wall portion in the lengthwise direction of the vehicle, and one end of the connecting wall portion in a widthwise direction of the vehicle is positioned lower than the other end of the connecting wall portion in the widthwise direction of the vehicle.

In this configuration, the connecting wall portion is inclined not only in the lengthwise direction, but also in the widthwise direction, of the vehicle. Thus, when the window glass is closed and comes into contact with the vertical seal lip, and the vertical seal lip is elastically deformed toward the inside of the cabin, the connecting wall portion does not become tense between the inner wall portion and the vertical seal lip, but is deformed easily under a small force. This may reduce the sliding resistance between the seal and the window glass moving up or down.

According to the first aspect of the present disclosure, an end of the belt line inner seal in the lengthwise direction of the vehicle and the vertical portion of the glass run are integrally molded without leaving, between the glass run and the belt line inner seal, any gap which could allow the sound and/or air inside the body of the door to enter the cabin. Further, the vertical seal lip of the glass run is continuous with the upper and lower belt line seal lips of the belt line inner seal, and the divider wall portion is provided between the upper and lower belt line seal lips of the vertical portion such that a space surrounded by the seal for the automobile door and the window glass is divided into a space closer to the vertical portion and a space closer to the belt line inner seal. This may improve a resistance of the seal to wear by the window glass which slides on the seal when moving up or down, while enhancing cabin quietness by blocking the flow of the sound and/or air going toward the inside of the belt line inner seal through the inside of the vertical portion of the glass run.

According to the second aspect of the present disclosure, a predetermined gap is formed between the lower belt line seal lip and the divider wall portion when the window glass is open, and the lower belt line seal lip is brought into contact with the divider wall portion when the window glass is closed such that a space inside the seal for the automobile door is divided into a space closer to the vertical portion and a space closer to the belt line inner seal. This may improve the resistance of the seal to wear, and enhance the cabin quietness.

According to the third aspect of the present disclosure, the lower belt line seal lip which is in contact with the closed window glass and elastically deformed is fitted in the notch of the divider wall portion. This may further improve the cabin quietness and the resistance of the seal to wear.

According to the fourth aspect of the present disclosure, the divider wall portion is inclined or curved such that its lower portion is positioned closer to a middle portion of the seal in the lengthwise direction of the vehicle than its upper portion. Thus, when the window glass moves upward, a front or rear corner of the window glass is not easily caught on the divider wall portion, which may further improve the resistance of the seal to wear.

According to the fifth aspect of the present disclosure, the divider wall portion is continuous with the vertical seal lip. This may further improve the cabin quietness.

According to the sixth aspect of the present disclosure, the inner wall portion of the vertical portion and the vertical seal lip are connected via the connecting wall portion extending from the proximal end to distal end of the vertical seal lip. Thus, the connecting wall portion may block the sound and/or air from going upward between the inner wall portion and the vertical seal lip. This may further improve the cabin quietness.

According to the seventh aspect of the present disclosure, the connecting wall portion is inclined in the lengthwise and widthwise directions of the vehicle. Thus, when the window glass is closed to come into contact with the vertical seal lip, and the vertical seal lip is elastically deformed toward the inside of the cabin, the connecting wall portion is easily deformed under a small force. This may reduce the sliding resistance between the seal and the window glass moving up or down.

DETAILED DESCRIPTION

Embodiments of the present disclosure will be described in detail below with reference to the drawings. The following description of advantageous embodiments is only an example in nature, and is not intended to limit the scope, applications or use of the present disclosure. In the following description of the embodiments, front and rear sides of a vehicle may simply be referred to as the "front," and the "rear," respectively.

First Embodiment (General Configuration for an Automobile Door)

Figure 1:
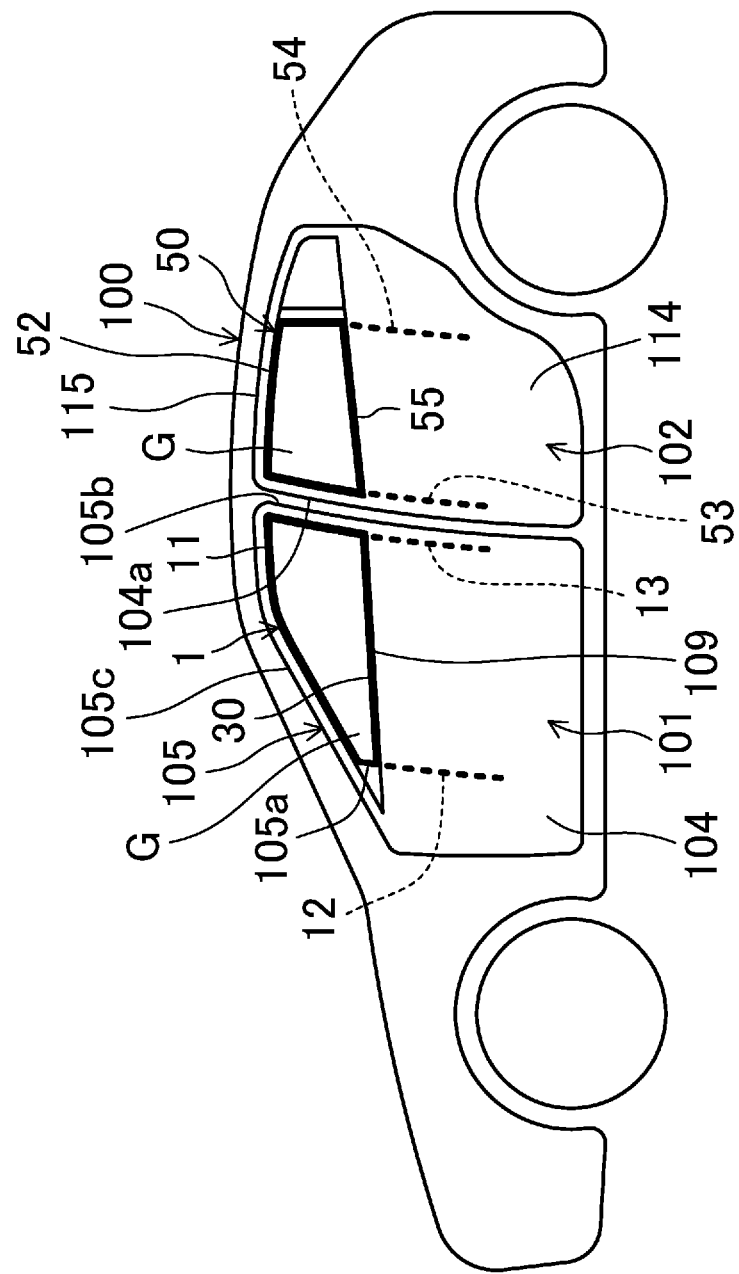
FIG. 1 is a left side view illustrating an automobile including a seal for an automobile door according to an embodiment.

FIG. 1 is a left side view illustrating an automobile 100 including a seal for an automobile door according to a first embodiment of the present disclosure. The automobile 100 includes a front door 101 and a rear door 102. Each of the front and rear doors 101 and 102 is provided to cover or uncover an opening (not shown) formed at the side of a vehicle body, and is configured to rotate around an axis extending in a vertical direction. The front door 101 includes a hollow door body 104 comprising almost lower half of the front door 101, and a window frame 105 comprising almost upper half of the front door 101. A window glass G is provided for the front door 101 such that the window glass G is movable up and down. The door body 104 houses a window regulator (not shown) for moving the window glass G up and down. When moved down, the window glass G is in an open state, and is housed inside the door body 104.

The rear door 102 also includes a hollow door body 114 and a window frame 115. A window glass G is movable up and down.

The present embodiment describes an example in which the present disclosure is applied to the front door 101 provided closer to the front of an automobile. However, the present disclosure may also be applicable to the rear door 102, and to a sliding door (not shown) as well. That is to say, the present disclosure may be applied to any door as long as the door includes a window glass which is movable up and down, and is not limited to the doors described in the embodiments.

Figure 4:
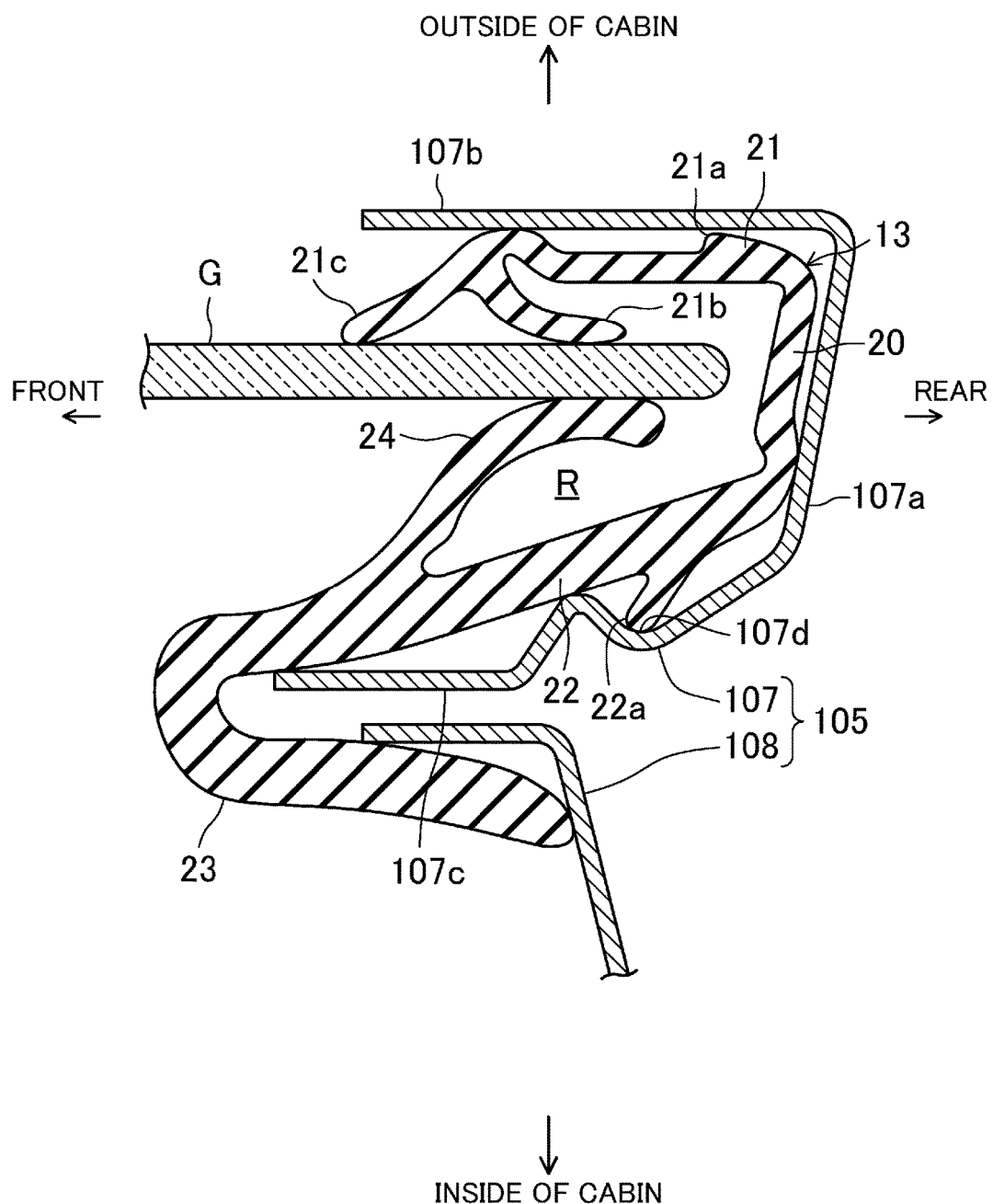
FIG. 4 is a cross-sectional view taken along the plane IV-IV shown in FIG. 2, illustrating a state where the seal is assembled to a window frame.

The window frame 105 is a frame member which functions as a sash supporting a peripheral portion of the window glass G. The window frame 105 of this embodiment is comprised of at least a channel member 107 formed by press-molding a steel plate or any other material, and a panel member 108 being assembled together as shown in FIG. 4. The window frame 105 may be formed by a roll forming method, for example.

As shown in FIG. 1, the window frame 105 includes a front vertical sash 105a, a rear vertical sash 105b, and an upper sash 105c. The front vertical sash 105a extends vertically in front of the front door 101, and opens toward the back when viewed in section. The rear vertical sash 105b extends vertically behind the front door 101, and opens toward the front when viewed in section. Lower portions of the front and rear vertical sashes 105a and 105b reach the inside of the door body 104, such that the window glass G moving downward is guided to the inside of the door body 104. The upper sash 105c extends from an upper end of the front vertical sash 105a to an upper end of the rear vertical sash 105b, and opens downward. The upper sash 105c is inclined such that its rear end is positioned higher than its front end in accordance with the shape of the window frame 105 and the shape of a roof of the automobile 100.

When the window glass G is fully closed, an upper portion of the window glass G is inserted in, and supported by, the upper sash 105c via an automobile door seal 1. Further, front and rear portions of the window glass G are inserted in, and supported by, the front and rear vertical sashes 105a and 105b, respectively, via the automobile door seal 1.

The top of the door body 104 serves as a belt line 109 extending in a lengthwise direction of the automobile. The belt line 109 is positioned on the side of a passenger.
(Configuration for a Seal for an Automobile Door)

Figure 2:
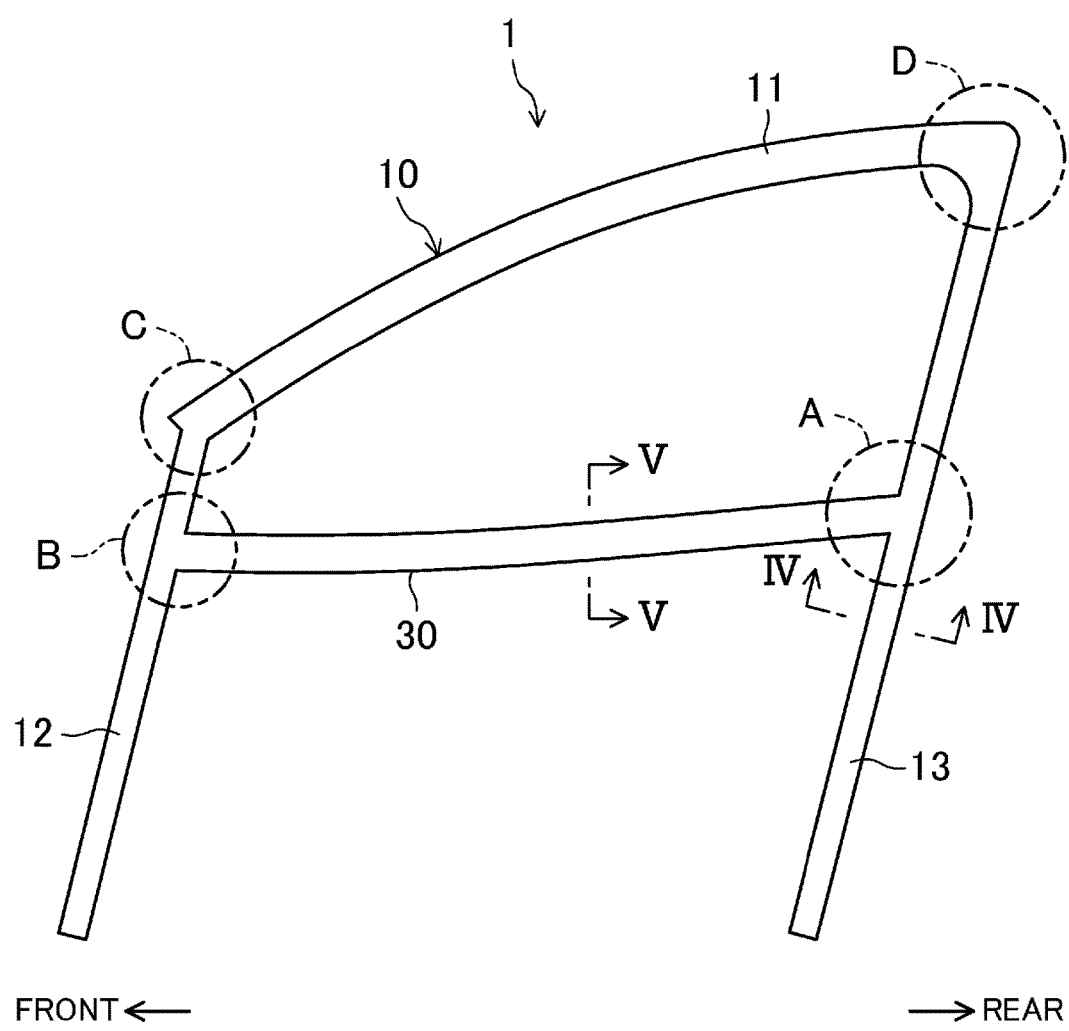
FIG. 2 is a side view illustrating the seal for the automobile door to be arranged on a front door as viewed from the outside of a cabin.

The automobile door seal 1 provided for the front door 101 is configured as shown in FIG. 2. Specifically, the automobile door seal 1 includes a glass run 10 which is assembled to the window frame 105, and a belt line inner seal 30 which is provided on an inner side of the belt line 109 of the door body 104 closer to the inside of the cabin, and extends in the lengthwise direction of the vehicle. The glass run 10 and the belt line inner seal 30 are integrally molded.

The glass run 10 is assembled to the channel member 107 with most part thereof being housed in the channel member 107. That is, the glass run 10 is assembled to the window frame 105 via the channel member 107. As a whole, the glass run 10 extends along the front vertical sash 105a, upper sash 105c, and rear vertical sash 105b of the window frame 105 so as to reach the rear vertical sash 105b from the front vertical sash 105a via the upper sash 105c. Portions of the glass run 10 extending along the front vertical sash 105a, the upper sash 105c, and the rear vertical sash 105b, respectively, (except for boundaries between them) are extrusion molded (extrusion-molded portions), while a boundary C between the portion extending along the front vertical sash 105a and the portion extending along the upper sash 105c, and a boundary D between the portion extending along the upper sash 105c and the portion extending along the rear vertical sash 105b are molded in a die (die-molded portions). The glass run 10 may be made of an elastic material such as thermoplastic elastomers including a styrene-based thermoplastic elastomer (TPS) and an olefin-based thermoplastic elastomer (TPO), and rubber, and is obtained by integrally molding the elastic material. Note that the glass run 10 may be made of a foamed material, or a non-foamed solid material.

The portion of the glass run 10 extending along the upper sash 105c (hereinafter referred to as an upper portion 11), the portion of the glass run 10 extending along the front vertical sash 105a (hereinafter referred to as a front vertical portion 12), and the portion of the glass run 10 extending along the rear vertical sash 105b (hereinafter referred to as a rear vertical portion 13) have basically the same cross-sectional shape. Thus, the rear vertical portion 13 will be described in detail below.

As shown in FIG. 4, the rear vertical portion 13 of the glass run 10 includes a bottom wall portion 20, an outer wall portion 21 closer to the outside of the cabin, and an inner wall portion 22 closer to the inside of the cabin. The bottom wall portion 20 extends in a widthwise direction of the cabin along a bottom wall portion 107a of the window frame 105. The bottom wall portion 20 of the glass run 10 is shorter in the widthwise direction of the cabin than the bottom wall portion 107a.

The outer wall portion 21 of the glass run 10 extends in the lengthwise direction of the vehicle from an end of the bottom wall portion 20 closer to the outside of the cabin along an outer wall portion 107b of the window frame 105. An outer protrusion 21a protrudes from an outer surface of the outer wall portion 21 closer to the outside of the cabin. A first outer seal lip 21b extending rearward, and a second outer seal lip 21c extending forward are provided for a front end of the outer wall portion 21. The first and second outer seal lips 21b and 21c are configured to elastically come into contact with an outer surface of the window glass G closer to the outside of the cabin.

The inner wall portion 22 of the glass run 10 extends in the lengthwise direction of the vehicle from an end of the bottom wall portion 20 closer to the inside of the cabin along an inner wall portion 107c of the window frame 105. Thus, the glass run 10 is in the shape of a channel which opens toward the same direction as the window frame 105. The outer and inner wall portions 21 and 22 are arranged to sandwich an end portion of the window glass G in the widthwise direction of the vehicle. The inner wall portion 22 is inclined such that its front end is positioned closer to the inside of the cabin than its rear end.

The inner wall portion 22 is longer in the lengthwise direction of the vehicle than the outer wall portion 21, and thus, a front end of the inner wall portion 22 is positioned forward of the front end of the outer wall portion 21. An inner protrusion 22a protrudes from an inner surface of the inner wall portion 22 closer to the inside of the cabin. The inner protrusion 22a is configured to engage with an engagement recess 107d of the window frame 105.

An inner design lip 23 is formed at an end (a front end) of the inner wall portion 22 opposite to the bottom wall portion 20 to cover the front end of the inner wall portion 107c of the window frame 105 and an inner surface of the panel member 108 closer to the inside of the cabin. The inner design lip 23 extends from the front end of the inner wall portion 22 toward the inside of the cabin, and then extends rearward, and has a rear end configured to elastically come into contact with the inner surface of the panel member 108.

On an outer surface of the inner wall portion 22 closer to the outside of the cabin, an inner seal lip (a vertical seal lip) 24 is formed to be in contact with an inner surface of the window glass G facing the inside of the cabin. The inner seal lip 24 extends rearward, while curving, from the vicinity of the front end of the inner wall portion 22. When the window glass G comes into contact with the inner seal lip 24, the inner seal lip 24 is elastically deformed inward, i.e., warps toward the inside of the cabin, to be in close contact with the inner surface of the window glass G. Thus, sealability is obtained.

Figure 5:
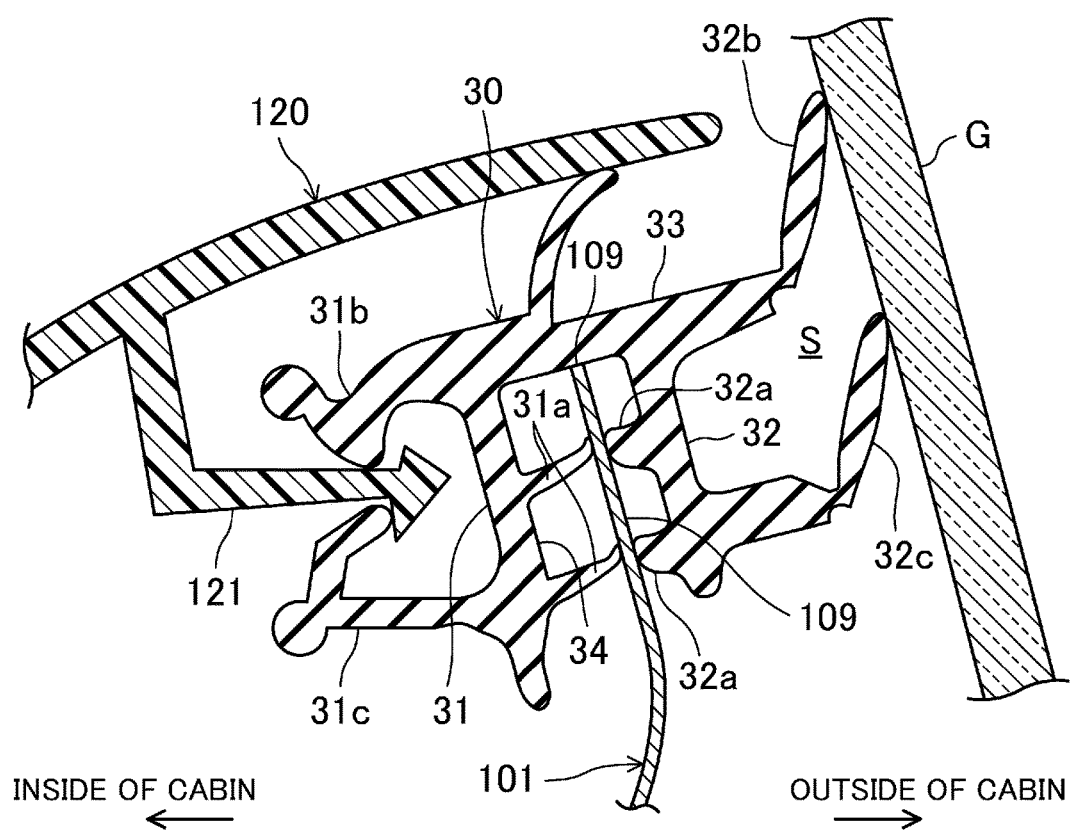
FIG. 5 is a cross-sectional view taken along the plane V-V shown in FIG. 2, illustrating a state where the seal is assembled to a front door.

The belt line inner seal 30 shown in FIG. 5 extends along the belt line 109 as a whole. As shown in FIG. 2, a front end of the belt line inner seal 30 is integrally molded in a die with a portion B (a vertical center portion) of the front vertical portion 12 of the glass run 10, and a rear end of the belt line inner seal 30 is integrally molded in a die with a portion A (a vertical center portion) of the rear vertical portion 13 of the glass run 10. Thus, the belt line inner seal 30 connects the front and rear vertical portions 12 and 13 together to form a frame. As shown in FIG. 1, below the belt line inner seal 30, the front and rear vertical portions 12 and 13 extend downward of the belt line 109 of the door body 104, and the lower ends of the front and rear vertical portions 12 and 13 are respectively open inside the door body 104.

As shown in FIG. 5, the belt line inner seal 30 includes an inner wall portion 31 positioned closer to the inside of the cabin than the belt line 109, an outer wall portion 32 positioned closer to the outside of the cabin than the belt line 109, and an upper wall portion 33. The inner and outer wall portions 31 and 32 extend vertically. A lower end of the inner wall portion 31 is positioned below a lower end of the outer wall portion 32. The upper wall portion 33 is connected to upper ends of the inner and outer wall portions 31 and 32.

A space between a lower portion of the inner wall portion 31 and a lower portion of the outer wall portion 32 opens downward. Thus, a panel receiving groove 34 opening downward is provided for the belt line inner seal 30 so that the belt line 109 is inserted therein. The panel receiving groove 34 extends between the ends (front and rear ends) of the belt line inner seal 30 in the lengthwise direction of the vehicle.

A pair of inner catching lips 31a, 31a extending in the lengthwise direction of the vehicle is provided for an outer surface of the inner wall portion 31 closer to the outside of the cabin such that the inner catching lips 31a are spaced from each other in the vertical direction. Further, a pair of outer catching lips 32a, 32a extending in the lengthwise direction of the vehicle is provided for an inner surface of the outer wall portion 32 closer to the inside of the cabin such that the outer catching lips 32a are spaced from each other in the vertical direction. The inner and outer catching lips 31a and 32a elastically come into contact with the belt line 109 inserted between the inner and outer wall portions 31 and 32, i.e., in the panel receiving groove 34, thereby catching the belt line 109.

Further, an upper engagement portion 31b and a lower engagement portion 31c which are configured to engage with an attachment 121 extending from an upper portion of a door trim 120 are provided for the inner surface of the inner wall portion 31 closer to the inside of the cabin. The attachment 121 of the door trim 120 is configured to be vertically sandwiched between the upper and lower engagement portions 31b and 31c.

An upper belt line seal lip 32b and a lower belt line seal lip 32c, each of which extends in the lengthwise direction of the vehicle, protrude toward the outside of the cabin from an outer surface of the outer wall portion 32 closer to the outside of the cabin. The upper and lower belt line seal lips 32b and 32c are made of an elastic material just like the glass run 10, and are spaced from each other in the vertical direction. The upper and lower belt line seal lips 32b and 32c are inclined such that their outer end closer to the outside of the cabin is positioned higher than their inner end closer to the inside of the cabin.

When the window glass G comes into contact with the upper and lower belt line seal lips 32b and 32c, the upper and lower belt line seal lips 32b and 32c are elastically deformed, i.e., warp toward the inside of the cabin, and come into close contact with the inner surface of the window glass G facing the inside of the cabin. Thus, sealability is ensured. Further, a closed space S surrounded by the outer wall portion 32, the window glass G, and the upper and lower belt line seal lips 32b and 32c is formed.

Although not shown, the belt line inner seal 30 may include a core. The core may be U-shaped when viewed in section, for example, and can be buried in the inner wall portion 31, upper wall portion 33, and outer wall portion 32 of the belt line inner seal 30. The core may be made of a rigid material such as an aluminum alloy, steel, stainless steel, and a rigid resin (e.g., a resin containing talc or glass fibers).

Further, the belt line inner seal 30 is not limited to the one having the cross-sectional shape shown in FIG. 5 as long as it includes two seal lips. For example, although not shown, the belt line inner seal 30 may have a cross-sectional shape shown in FIG. 4(b) of Japanese Patent No. 3746866, or FIG. 5 of Japanese Patent No. 3357830.

Figure 6:
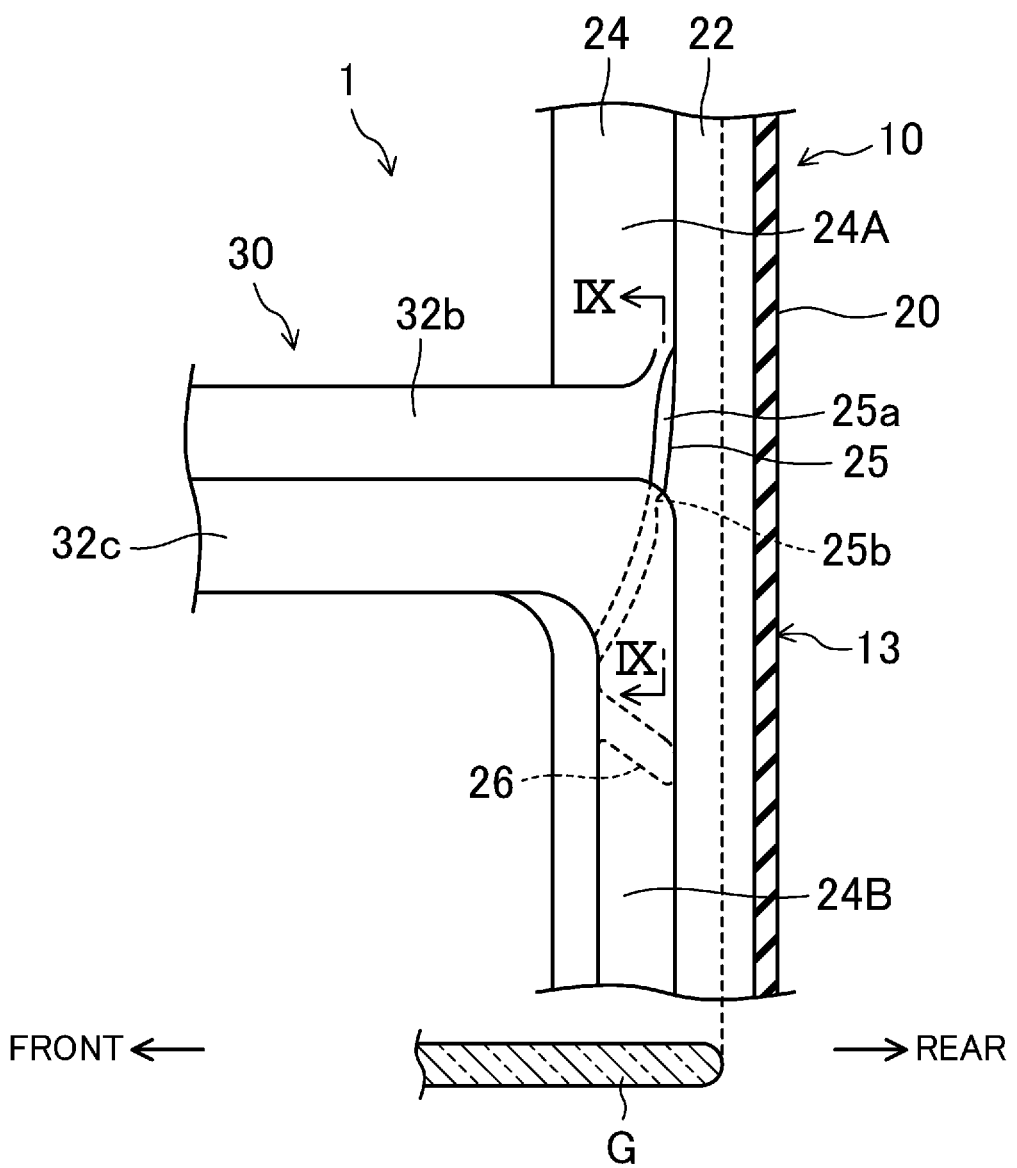
FIG. 6 is an enlarged view of a portion A shown in FIG. 2, in which an outer side of a rear vertical portion of a glass run closer to the outside of the cabin is not shown.

As shown in FIG. 6, rear ends of the upper and lower belt line seal lips 32b and 32c are continuous with the inner seal lip 24 of the rear vertical portion 13 of the glass run 10. Likewise, front ends of the upper and lower belt line seal lips 32b and 32c are continuous with an inner seal lip (not shown) of the front vertical portion 12 of the glass run 10.

Figure 7:
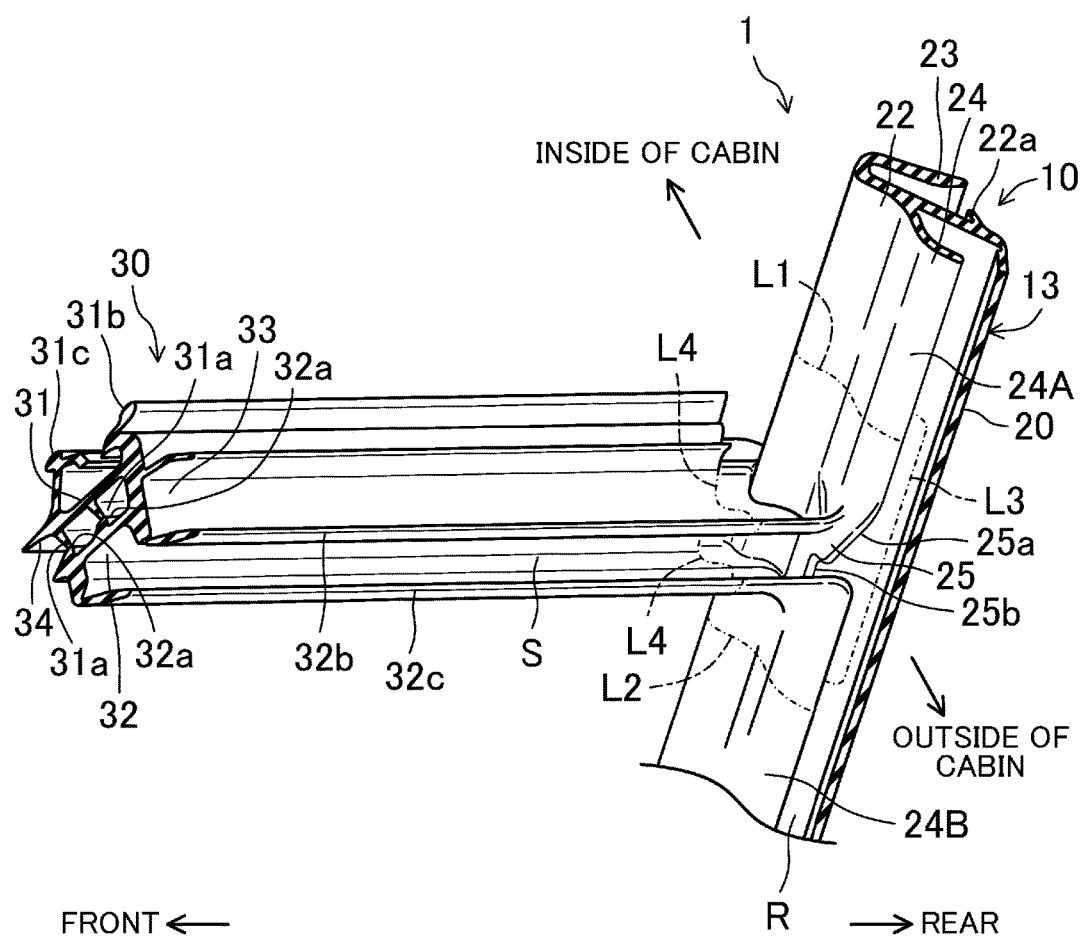
FIG. 7 is a perspective view illustrating the portion A shown in FIG. 2 as viewed obliquely from above and the front from the outside of the cabin, in which the outer side of the rear vertical portion of the glass run is not shown.

More specifically, as shown in FIG. 7, the inner seal lip 24 of the rear vertical portion 13 extends basically in the vertical direction. The inner seal lip 24 is discontinuous near the belt line 109, i.e., the inner seal lip 24 has a break. The inner seal lip 24 is divided into an upper inner seal lip 24A above the break and a lower inner seal lip 24B below the break. A lower end portion of the upper inner seal lip 24A is continuous with a rear end of the upper belt line seal lip 32b. Further, an upper end portion of the lower inner seal lip 24B is continuous with a rear end of the lower belt line seal lip 32c.

Figure 9:
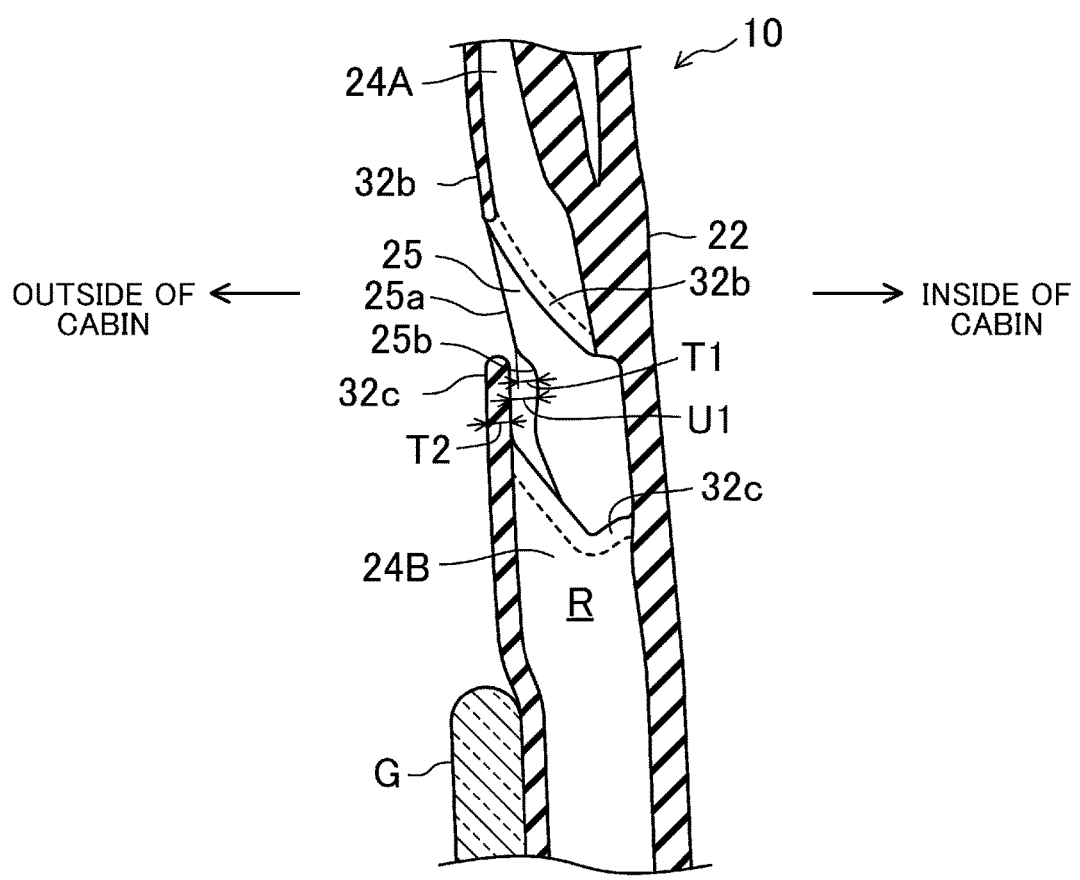
FIG. 9 is a cross-sectional view taken along the plane IX-IX shown in FIG. 6, illustrating a state where a window glass is open.

A divider wall portion 25 extending vertically and protruding toward the outside of the cabin is provided between the upper and lower belt line seal lips 32b and 32c of the inner wall portion 22 of the rear vertical portion 13. The divider wall portion 25 divides a space surrounded by the automobile door seal 1 and the window glass G into a space closer to the rear vertical portion 13 and a space closer to the belt line inner seal 30. As shown in FIG. 9, an upper portion of the divider wall portion 25 is connected to the upper inner seal lip 24A, and a lower portion of the divider wall portion 25 is continuous with the lower inner seal lip 24B. Thus, the upper and lower inner seal lips 24A and 24B are connected via the divider wall portion 25.

In addition, as shown in FIG. 7, the divider wall portion 25 is inclined or curved such that its lower portion is positioned closer to a middle portion of the automobile door seal 1 in the lengthwise direction of the vehicle than its upper portion. Specifically, an edge 25a of the divider wall portion 25 closer to the outside of the cabin is inclined or curved such that its lower portion is positioned closer to the middle portion of the seal 1 in the lengthwise direction of the vehicle, and farther from the outside of the cabin, than its upper portion. Thus, the divider wall portion 25 gradually gets shorter than the upper inner seal lip 24A, and the lower portion of the divider wall portion 25 is positioned away in the forward direction from the rear corner of the window glass G, as it goes down. Therefore, when the window glass G lowered below the divider wall portion 25 as shown in FIG. 9 moves upward to the position shown in FIG. 10, the upper rear corner of the window glass G is not easily caught on the lower portion of the divider wall portion 25.

Figure 8:
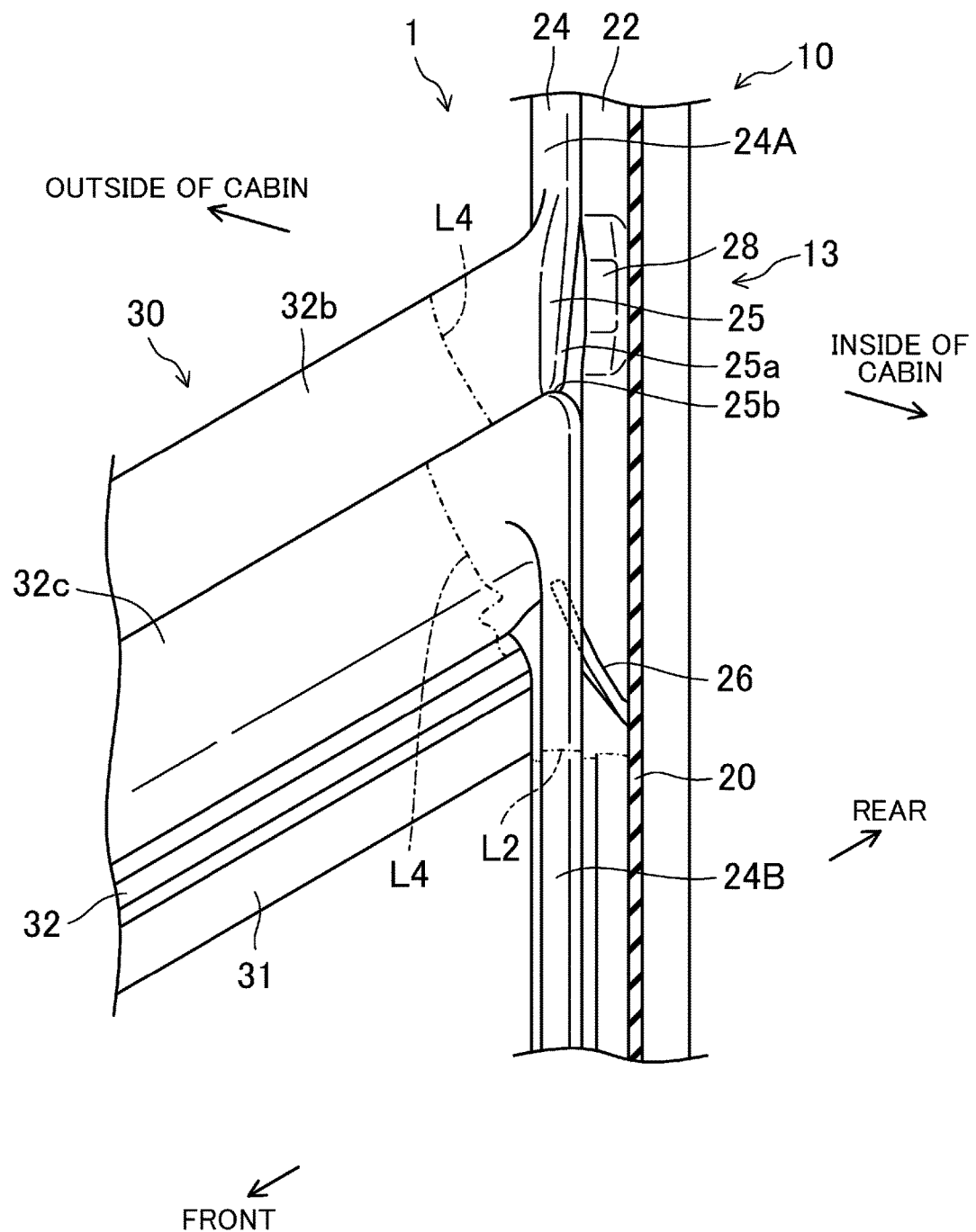
FIG. 8 is a perspective view illustrating the portion A shown in FIG. 2 as viewed obliquely from below and the front from the outside of the cabin, in which the outer side of the rear vertical portion of the glass run is not shown.
Figure 10:
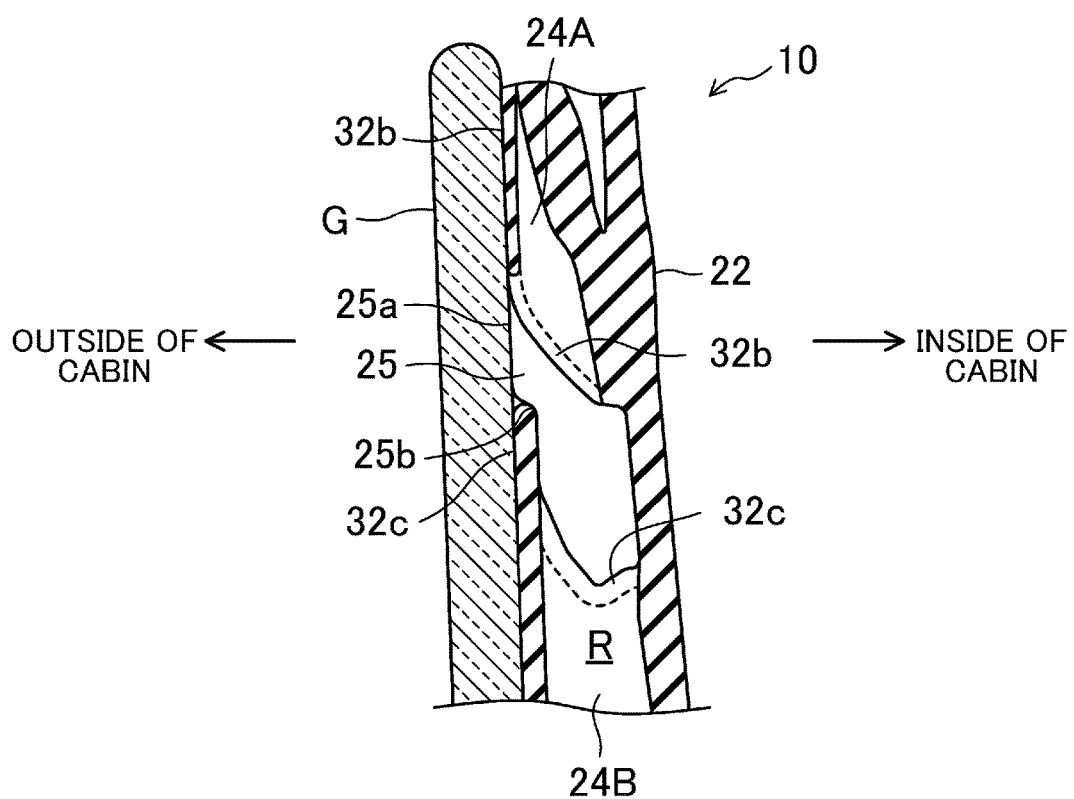
FIG. 10 is a view corresponding to FIG. 9, illustrating a state where the window glass is closed.

As shown in FIGS. 7 and 8, the edge 25a of the divider wall portion 25 closer to the outside of the cabin extends vertically, and a notch 25b is formed to extend downward from a vertical center portion of the edge 25a. When the window glass G moves upward to be closed as shown in FIG. 10, the inner surface of the window glass G facing the inside of the cabin comes into contact with a die-molded portion of the upper belt line seal lip 32b and a die-molded portion of the lower belt line seal lip 32c. Then, the die-molded portions of the upper and lower belt line seal lips 32b and 32c are elastically deformed toward the inside of the cabin. At this time, the tip of the die-molded portion of the lower belt line seal lip 32c is fitted in the notch 25b (see FIG. 10).

Further, as shown in FIG. 9, the notch 25b has a depth T1 which is substantially the same as the thickness T2 of the tip of the die-molded portion of the lower belt line seal lip 32c. With the tip of the die-molded portion of the lower belt line seal lip 32c fitted in the notch 25b as shown in FIG. 10, an outer surface of the tip of the die-molded portion of the lower belt line seal lip 32c closer to the outside of the cabin is substantially flush with a portion of the edge 25a of the divider wall portion 25 above the notch 25b. When the window glass G is closed, the lower inner seal lip 24B is also elastically deformed toward the inside of the cabin as it is pushed by the inner surface of the window glass G. Thus, an inner surface of the elastically deformed lower inner seal lip 24B closer to the inside of the cabin comes into contact with a portion of the edge 25b of the divider wall portion 25 below the notch 25b.

As can be seen from the foregoing, in a situation where the upper and lower inner seal lips 24A and 24B are connected via the divider wall portion 25, the tip of the lower belt line seal lip 32c is fitted in the notch 25b and brought into contact with the peripheral edge of the notch 25b by the window glass G closed as shown in FIG. 10, and the inner surface of the lower inner seal lip 24B closer to the inside of the cabin is brought into contact with the portion of the edge 25a of the divider wall portion 25 below the notch 25b, the space surrounded by the automobile door seal 1 and the window glass G is divided into the space R closer to the rear vertical portion 13 and the space S closer to the belt line inner seal 30. Thus, the space R between the lower inner seal lip 24B and the inner wall portion 22 (shown in FIGS. 4, 7, 9, and 10), and the space S between the lower belt line seal lip 32c and the outer wall portion 32 (shown in FIGS. 5 and 7) no longer communicate with each other.

On the other hand, when the window glass G is open as shown in FIG. 9, the window glass G separates from the die-molded portion of the lower belt line seal lip 32c. Then, the die-molded portion of the lower belt line seal lip 32c returns to the original shape, and separates from the divider wall portion 25 to form a predetermined gap U1 between the lower belt line seal lip 32c and the divider wall portion 25. That is, the notch 25b ensures a space which allows the lower belt line seal lip 32c pushed by the closed window glass G to move toward the inside of the cabin. If the depth T1 of the notch 25b is too large, the die-molded portion of the lower belt line seal lip 32c pushed by the closed window glass G cannot be brought into close contact with the window glass G, which may deteriorate the sealability. On the other hand, if the depth T1 of the notch 25b is too small, the die-molded portion of the lower belt line seal lip 32c pushed by the closed window glass G cannot escape sufficiently toward the inside of the cabin, which may excessively increase a sliding resistance between the window glass G and the die-molded portion of the lower belt line seal lip 32c. Therefore, in order to bring the die-molded portion of the lower belt line seal lip 32c into sufficiently close contact with the window glass G, and to avoid the increase in the sliding resistance between the window glass G and the die-molded portion of the lower belt line seal lip 32c, the depth T1 of the notch 25b is set to a predetermined depth. Specifically, the depth T1 of the notch 25b is set substantially the same as the thickness T2 of the tip of the die-molded portion of the lower belt line seal lip 32c.

As shown in FIG. 8, the rear vertical portion 13 includes a connecting wall portion 26 connecting the inner wall portion 22 and the lower inner seal lip 24B. The connecting wall portion 26 extends from the inner wall portion 22 to the lower inner seal lip 24B, and from a proximal end to a distal end of the lower inner seal lip 24B. In this configuration, the space R between the lower inner seal lip 24B and the inner wall portion 22 (shown in FIGS. 9 and 10) is divided into two spaces above and below the connecting wall portion 26. The connecting wall portion 26 is inclined such that its rear end is positioned lower than its front end as indicated by a broken line in FIG. 6, and its inner end closer to the inside of the cabin is positioned lower than its outer end closer to the outside of the cabin as shown in FIG. 8.

In addition, as shown in FIG. 8, a recess 28 is provided for the outer surface of the inner wall portion 22 of the rear vertical portion 13. The recess 28 is arranged to face a junction between the rear end of the upper belt line seal lip 32b and the lower end of the upper inner seal lip 24A. When the upper belt line seal lip 32b and the upper inner seal lip 24A are elastically deformed toward the inside of the cabin by being pushed by the window glass G, the recess 28 receives a thick portion of the junction between the rear end of the upper belt line seal lip 32b and the lower end of the upper inner seal lip 24A. This may facilitate the elastic deformation of the upper belt line seal lip 32b and the upper inner seal lip 24A.

The front vertical portion 12 of the automobile door seal 1 is different from the rear vertical portion 13 in that it opens rearward when viewed in section. However, the front vertical portion 12 is configured fundamentally in the same manner as the rear vertical portion 13. The front end of the belt line inner seal 30 and the front vertical portion 12 are integrally molded with each other just like the rear end of the belt line inner seal 30 and the rear vertical portion 13. Although not shown, the front vertical portion 12 also has the divider wall portion and the connecting wall portion.

The automobile door seal 1 includes die-molded portions and extrusion-molded portions. For example, a portion surrounded by boundaries L1, L2, L3, and L4 shown in FIG. 7 (L4 is also shown in FIG. 8) is the die-molded portion. Other portions of the rear vertical portion 13 than the die-molded portion surrounded by the boundaries L1, L2, and L3 are the extrusion-molded portions, and a portion of the belt line inner seal 30 forward of the boundary L4 is also the extrusion-molded portion as well.

Figure 3:
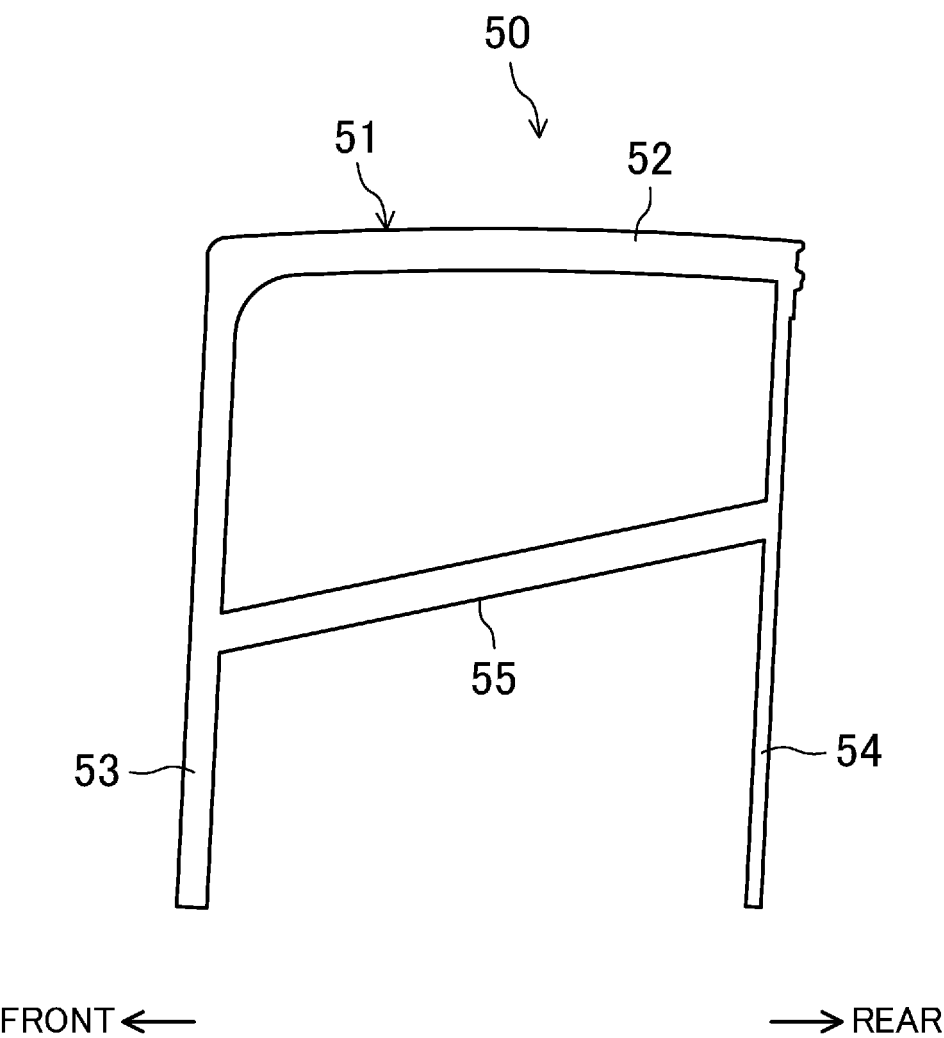
FIG. 3 is a side view illustrating the seal for the automobile door to be arranged on a rear door as viewed from the outside of the cabin.

Further, as shown in FIGS. 1 and 3, an automobile door seal 50 provided for the rear door 102 has fundamentally the same configuration as the automobile door seal 1 provided for the front door 101, but its shape is modified in accordance with the shape of the rear door 102. Specifically, the automobile door seal 50 includes a glass run 51, and a belt line inner seal 55. The glass run 51 includes an upper portion 52, a front vertical portion 53, and a rear vertical portion 54. Although not shown, a divider wall portion and a connecting wall portion are provided at a junction between the front end of the belt line inner seal 55 and the front vertical portion 53. Another divider wall portion and another connecting wall portion are also provided for a junction between the rear end of the belt line inner seal 55 and the rear vertical portion 54 as well, although they are not shown in the drawings.

Advantages of the Embodiment

Advantages of the rear vertical portion 13 and belt line inner seal 30 of the automobile door seal 1 provided for the front door 101 will be described below. Note that the advantages obtained by the front vertical portion 12 and the belt line inner seal 30, and those obtained by the automobile door seal 50 provided for the rear door 102 are substantially the same.

When the window glass G is open, an upper edge of the window glass G is positioned lower than the die-molded portion of the lower belt line seal lip 32c as shown in FIG. 9. In this state, a predetermined gap U1 is formed between the die-molded portion of the lower belt line seal lip 32c and the divider wall portion 25, and thus, the space R between the lower inner seal lip 24B and the inner wall portion 22 (shown in FIGS. 9 and 10) communicates with the space S between the die-molded portion of the lower belt line seal lip 32c and the outer wall portion 32 (shown in FIG. 5).

To close the window glass G, the window glass G moves upward from the position shown in FIG. 9, with the inner surface of the window glass G sliding along the outer surface of the lower inner seal lip 24B. At this time, the connecting wall portion 26, which is provided on the inner side of the lower inner seal lip 24B closer to the inside of the cabin, could become tense between the lower inner seal lip 24B and the inner wall portion 22. In this embodiment, however, the connecting wall portion 26 is inclined in the lengthwise direction of the vehicle as shown in FIG. 6, and in the widthwise direction of the vehicle as shown in FIG. 8. Thus, when the window glass G comes into contact with the lower inner seal lip 24B, and the lower inner seal lip 24B is elastically deformed toward the inside of the cabin, the connecting wall portion 26 does not become tense between the inner wall portion 22 and the lower inner seal lip 24B, but is easily deformed under a relatively small force. Thus, the sliding resistance between the connecting wall portion 26 and the window glass G moving up or down does not increase excessively.

Then, the window glass G further moves upward to reach the lower belt line seal lip 32c. In this embodiment, the divider wall portion 25, which is provided for the rear vertical portion 13, has the edge 25a closer to the outside of the cabin being inclined or curved such that its lower portion is positioned closer to the middle portion of the seal 1 in the lengthwise direction of the vehicle, and farther from the outside of the cabin, than its upper portion. Thus, the lower portion of the divider wall portion 25 is positioned away in the forward direction from the rear corner of the window glass G. As a result, the upper rear corner of the window glass G moving upward is not easily caught on the lower portion of the divider wall portion 25. This may improve the resistance of the automobile door seal 1 to wear by the glass.

As the window glass G further moves upward, the lower belt line seal lip 32c pushed by the window glass G is elastically deformed toward the inside of the cabin, and the tip of the lower belt line seal lip 32c is fitted in the notch 25b. Thus, the tip of the lower belt line seal lip 32c is allowed to escape toward the inside of the cabin, which may avoid an excessive increase in the sliding resistance of the window glass G. Moreover, the tip of the lower belt line seal lip 32c is fitted in the notch 25b to be in contact with the peripheral edge of the notch 25b, and the inner surface of the lower inner seal lip 24B closer to the inside of the cabin comes into contact with the edge 25a of the divider wall portion 25 below the notch 25b. Thus, the space R between the lower inner seal lip 24B and the inner wall portion 22 (shown in FIGS. 9 and 10) no longer communicates with the space S between the lower belt line seal lip 32c and the outer wall portion 32 (shown in FIG. 5).

Consequently, even if the sound and/or air inside the door body 104 of the front door 101 goes upward through the space R in the rear vertical portion 13, the sound and/or air hits the divider wall portion 25, and may be prevented from going to the inside of the belt line inner seal 30. In addition, the rear vertical portion 13 of the glass run 10 and the belt line inner seal 30 are integrally molded without leaving, between the rear vertical portion 13 and the belt line inner seal 30, any gap which could allow the sound and/or air inside the door body 104 to easily enter the cabin. Moreover, the connecting wall portion 26 may block the sound and/or air going upward through the space between the inner wall portion 22 of the rear vertical portion 13 and the lower inner seal lip 24B. This may reduce the chance that the sound and/or air will come to the side of the passenger, i.e., around his or her ear.

As can be seen from the foregoing, the first embodiment may improve the resistance of the automobile door seal 1 to wear by the window glass G sliding on the automobile door seal 1 when moving up or down, while enhancing cabin quietness.

Second Embodiment

Figure 11:
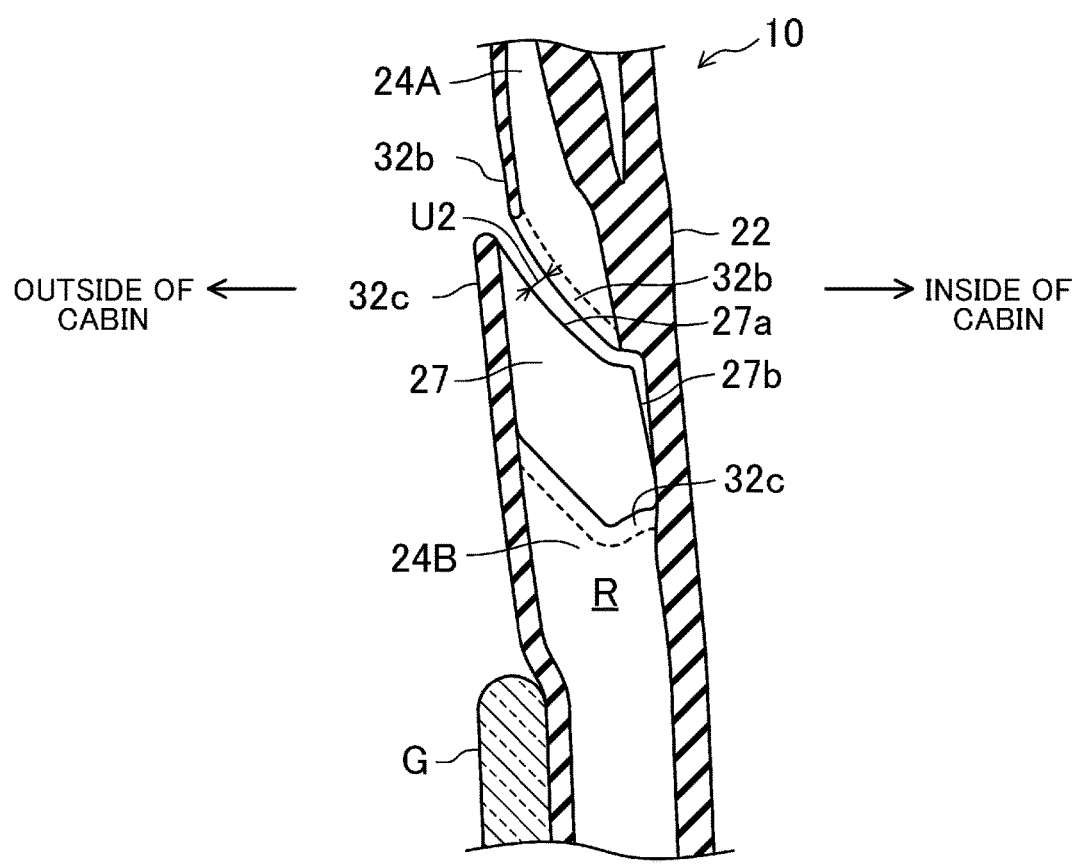
FIG. 11 is a view corresponding to FIG. 9, illustrating a second embodiment.
Figure 12:
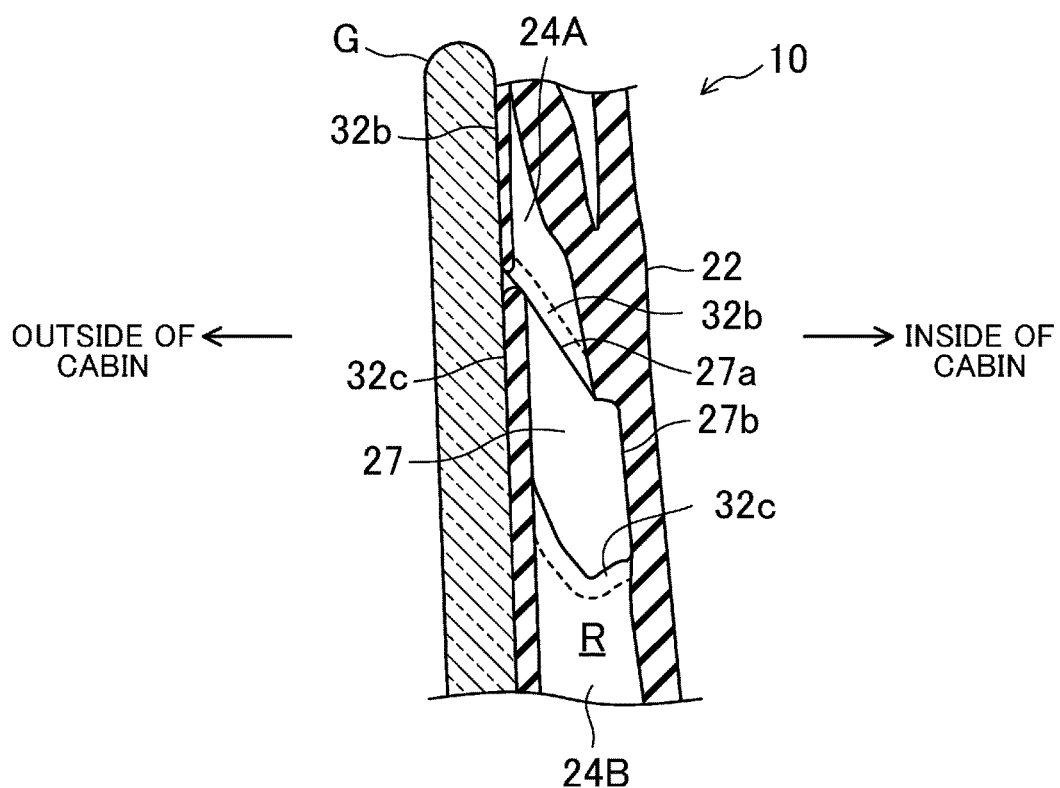
FIG. 12 is a view corresponding to FIG. 10, illustrating the second embodiment.

FIGS. 11 and 12 show a second embodiment of the present disclosure. The second embodiment is configured in the same manner as the first embodiment except that a divider wall portion 27 is integrally molded with the lower inner seal lip 24B. Thus, the same components as those of the first embodiment will be designated by the same reference characters, and the description of such components is not repeated. Only the difference between the first and second embodiments will be described in detail below.

Specifically, the divider wall portion 27 is integral with the inner surface of the lower inner seal lip 24B closer to the inside of the cabin, and is configured to be displaced as the lower inner seal lip 24B is displaced. As shown in FIG. 11, when the window glass G is open, an edge 27a of the divider wall portion 27 closer to the inside of the cabin is positioned away from the inner wall portion 22 toward the outside of the cabin, and an upper edge 27b of the divider wall portion 27 is positioned away from and below the upper inner seal lip 24A. Thus, a gap U2 is formed between the upper edge 27b of the divider wall portion 27 and the upper inner seal lip 24A.

On the other hand, when the window glass G is closed as shown in FIG. 12, the lower inner seal lip 24B is pushed, and elastically deformed, toward the inside of the cabin by the inner surface of the window glass G. Then, the edge 27a of the divider wall portion 27 comes into contact with the inner wall portion 22, and the upper edge 27b of the divider wall portion 27 comes into contact with the upper inner seal lip 24A. Thus, the divider wall portion 27 divides a space surrounded by the automobile door seal 1 and the window glass G into a space closer to the rear vertical portion 13 and a space closer to the belt line inner seal 30. This may provide substantially the same advantages as those obtained in the first embodiment.

The embodiments described above are merely exemplary ones in nature in all respects, and shall not be interpreted in a limited manner. Any variations or modifications falling within the range of equivalents to the claims to be described below are all encompassed within the scope of the present disclosure.

As can be seen in the foregoing, the seal for an automobile door of the present disclosure may be arranged to a front or rear door of an automobile, for example.

What is claimed is:

1. A seal for an automobile door of an automobile, the automobile having a cabin, the automobile door having a body and a window frame that supports a peripheral portion of a window glass, the seal comprising:
    a glass run configured to attach to the window frame such that the window glass is movable up and down within the window frame; and
    a belt line inner seal configured to attach to an inner side of a belt line of the body of the automobile door, wherein the belt line inner seal is located closer to an inside of the cabin than an outside of the cabin of the automobile when the automobile door is closed, and extends in a lengthwise direction of the automobile when the automobile door is closed,
    the glass run including a vertical portion extending in a moving direction of the window glass such that a distal lower end of the vertical portion forms an opening inside the body of the automobile door, and
    the belt line inner seal is integrally molded with the vertical portion of the glass run, wherein:
    the vertical portion of the glass run includes a vertical seal lip which is configured to be elastically deformed when contacting an inner surface of the window glass facing the inside of the cabin when the automobile door is closed,
    the belt line inner seal includes an upper belt line seal lip and a lower belt line seal lip which are configured to be elastically deformed when contacting the inner surface of the window glass facing the inside of the cabin when the automobile door is closed, the upper and lower belt line seal lips extending in the lengthwise direction of the automobile when the automobile door is closed, and being vertically spaced from each other,
    the vertical seal lip of the glass run is integral and unitary with an end of each of the upper and lower belt line seal lips in the lengthwise direction of the automobile, and
    the vertical portion includes a divider wall portion extending in a vertical direction and protruding toward the outside of the cabin between the upper and lower belt line seal lips, and
    a space surrounded by the seal and the window glass is at least partially divided by the divider wall portion into a space in the vertical portion and a space in the belt line inner seal.

2. The seal for the automobile door of claim 1, wherein the lower belt line seal lip is spaced apart from the divider wall portion to form a predetermined gap between the lower belt line seal lip and the divider wall portion when the window glass is in an opened state, in which the window glass is disengaged from the lower belt line seal lip, and
when the window glass is in a closed state, the window glass contacts the lower belt line seal lip to elastically deform the lower belt line seal lip causing the lower belt line seal lip to contact the divider wall portion.

3. The seal for the automobile door of claim 2, wherein the divider wall portion has an edge, and the edge has a notch configured to receive the lower belt line seal lip when the window glass in the closed state.

4. The seal for the automobile door of claim 1, wherein the divider wall portion is inclined such that an upper portion of the divider wall portion extends toward the outside of the cabin when the automobile door is closed to a greater extent than a lower portion of the divider portion extends toward the outside of the cabin when the automobile door is closed.

5. The seal for the automobile door of claim 1, wherein an upper portion and a lower portion of the divider wall portion are continuous with the vertical seal lip.

6. The seal for the automobile door of claim 1, wherein the vertical portion includes an inner wall portion and an outer wall portion the inner and outer wall portions being arranged to sandwich the window glass therebetween,
the vertical seal lip is formed on an outer surface of the inner wall portion,
the inner wall portion and the vertical seal lip are connected via a connecting wall portion extending from the inner wall portion to the vertical seal lip, and
the connecting wall portion extends from a proximal end to a distal end of the vertical seal lip.

7. The seal for the automobile door of claim 6, wherein the connecting wall portion has a first end and a second end, and
the connecting wall portion is inclined such that the first end of the connecting wall portion is positioned lower than the second end of the connecting wall portion.

8. The seal for the automobile door of claim 1, wherein the divider wall portion is curved and an upper portion of the divider wall portion extends toward the outside of the cabin when the automobile door is closed to a greater extent than a lower portion of the divider wall portion extends toward the outside of the cabin when the automobile door is closed.

* * * * *